(12) United States Patent
Keithley et al.

(10) Patent No.: US 8,098,405 B2
(45) Date of Patent: Jan. 17, 2012

(54) LASER PRINT APPARATUS WITH DUAL HALFTONES

(75) Inventors: Douglas Gene Keithley, Boise, ID (US); Jay R. Shoen, Boise, ID (US)

(73) Assignee: Marvell International Technology Ltd. (BM)

( * ) Notice: Subject to any disclaimer, the term of this patent is extended or adjusted under 35 U.S.C. 154(b) by 0 days.

(21) Appl. No.: 12/781,565

(22) Filed: May 17, 2010

(65) Prior Publication Data
US 2010/0225973 A1 Sep. 9, 2010

Related U.S. Application Data

(63) Continuation of application No. 10/974,079, filed on Oct. 27, 2004, now Pat. No. 7,733,532.

(51) Int. Cl.
*H04N 1/405* (2006.01)
(52) U.S. Cl. ....... 358/3.06; 358/3.27; 382/254; 382/266
(58) Field of Classification Search ............ 358/3.06, 358/3.27, 1.1, 1.2, 1.9, 3.01; 382/266, 173, 382/176, 254, 264
See application file for complete search history.

(56) References Cited

U.S. PATENT DOCUMENTS

| | | | |
|---|---|---|---|
| 4,460,909 A | 7/1984 | Bassetti et al. | |
| 4,782,398 A | 11/1988 | Mita | |
| 4,821,109 A | 4/1989 | Roe | |
| 5,005,139 A | 4/1991 | Tung | |
| 5,014,333 A | 5/1991 | Miller et al. | |
| 5,243,443 A | 9/1993 | Eschbach | |
| 5,268,774 A | 12/1993 | Eschbach | |
| 5,321,523 A | 6/1994 | Hashimoto | |
| 5,392,061 A | 2/1995 | Vondran, Jr. | |
| 5,465,157 A | 11/1995 | Seto et al. | |
| 5,652,660 A | 7/1997 | Seto et al. | |
| 5,805,734 A | 9/1998 | Ebner | |
| 5,822,469 A | 10/1998 | Silverstein | |
| 5,957,593 A | 9/1999 | Kroon | |
| 5,991,512 A | 11/1999 | Shaked et al. | |
| 6,178,011 B1 * | 1/2001 | Lin et al. | 358/1.9 |
| 6,342,953 B1 | 1/2002 | Wibbels et al. | |
| 6,389,167 B1 | 5/2002 | Wetchler et al. | |
| 6,501,564 B1 | 12/2002 | Schramm et al. | |
| 6,563,957 B1 | 5/2003 | Li et al. | |
| 6,650,793 B1 | 11/2003 | Lund et al. | |
| 6,704,123 B1 | 3/2004 | Av-Shalom et al. | |
| 6,760,126 B1 | 7/2004 | Kritayakirana et al. | |
| 7,068,852 B2 | 6/2006 | Braica | |
| 2003/0210409 A1 | 11/2003 | Huang et al. | |
| 2004/0174566 A1 | 9/2004 | Akahori | |

FOREIGN PATENT DOCUMENTS

CN 1677433 A 10/2005
(Continued)

OTHER PUBLICATIONS

A partial GM Search Report for Application No. GB0521853.2 mailed Dec. 13, 2005 (1 pg).

(Continued)

*Primary Examiner* — Thomas D Lee

(57) ABSTRACT

A printing system comprises a memory configured to store image data representing an image. The printing system comprises a processor configured to perform a first digital halftone process on a first portion of the image and a second digital halftone process on a second portion of the image.

20 Claims, 6 Drawing Sheets

FOREIGN PATENT DOCUMENTS

| | | |
|---|---|---|
| EP | 0946049 | 9/1999 |
| EP | 1 501 277 | 1/2005 |
| JP | 10191054(A) | 7/1998 |
| JP | 11331562(A) | 11/1999 |
| JP | 2004-112604 | 4/2004 |

OTHER PUBLICATIONS

Examination Report for Application No. GB0521853.2 dated Sep. 14, 2010 (3 pages).

Text of the First Office Action, Chinese Patent Publication No. 200510093897.8.

Text of the Second Office Action, Chinese Patent Publication No. 200510093897.8.

Text of the Third Office Action, Chinese Patent Publication No. 200510093897.8.

Partial English Translation of CN1677433A and JP2004-112604.

* cited by examiner

LASER PRINT APPARATUS WITH DUAL HALFTONES

This application is a continuation application of U.S. patent application Ser. No. 10/974,079, filed Oct. 27, 2004, which is hereby incorporated by reference in its entirety.

BACKGROUND

Color and gray value digital images are both composed of picture elements (pixels), where each pixel is represented by multiple binary bits that define either a color or a gray level. In order to represent such an image on a bi-level printer, the individual color or gray level pixels are typically converted to binary level pixels through use of a digital halftoning process.

Digital halftoning is the process of transforming a continuous-tone image into a lower bit-depth, typically binary, image that has the illusion of the original continuous-tone image, using a careful arrangement of lower bit-depth picture elements. The process is also referred to as spatial dithering. In the case of color images, the color continuous-tone image is typically separated into color channels first. Separate halftones are then formed for each of the color channels.

Typically, for laser printers, ordered cluster dot halftones using lower lines per inch (lpi), such as 100-150 lpi, are best for photographs, areas of constant gray scale, or gradient patterns. Halftones using a lower lpi reduce print artifacts, such as banding, but may result in jagged edges for the sharp edges found in text and line art. Halftones using a higher lpi, such as 200-300 lpi, are best for text and line art, but are not as good for photographs, areas of constant gray scale, and gradient patterns. Print artifacts, such as banding, become more pronounced as the lpi is increased.

SUMMARY

One aspect of the present invention provides a printing system comprising a memory and a processor. The memory is configured to store image data representing an image. The processor is configured to perform a first digital halftone process on a first portion of the image and a second digital halftone process on a second portion of the image.

DETAILED DESCRIPTION

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1A:
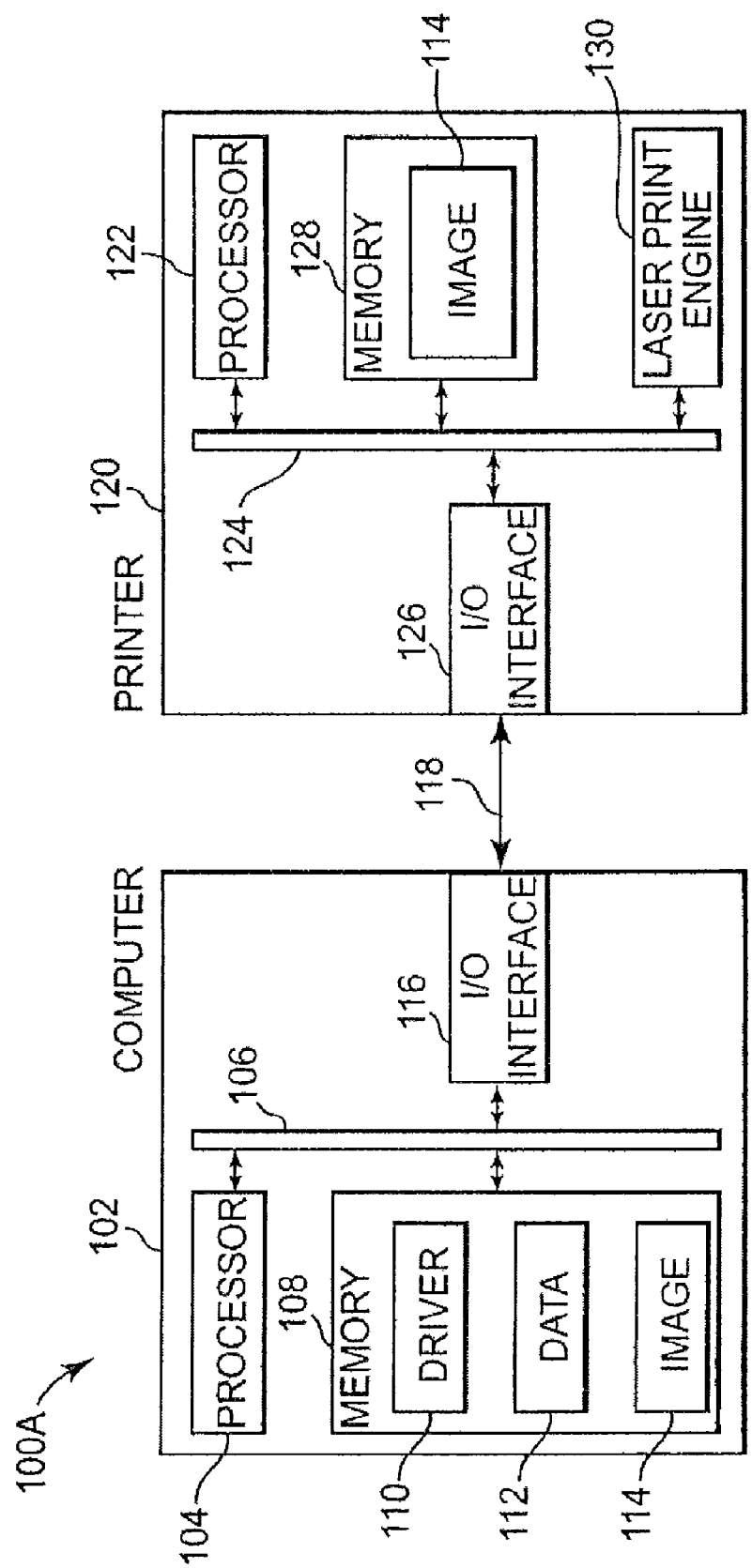
FIG. 1A is a block diagram illustrating one embodiment of major components of a printing system.

FIG. 1A is a block diagram illustrating one embodiment of major components of a printing system 100A. Printing system 100A includes host or computer 102 and printer 120. In one embodiment, printer 120 is a laser printer or laser print apparatus.

Computer 102 includes processor 104, memory 108, and input/output (I/O) interface 116, which are communicatively coupled together via bus 106. Driver 110, data 112 to be printed, and image data 114 are stored in memory 108. In one embodiment, driver 110 is executed by processor 104 to render data 112 to be printed into image data 114, including performing a dual halftone process as described in further detail below with reference to FIGS. 2-5. The data 112 to be printed may be any type of printable data, such as image files, word processing files, etc. In one embodiment, image data 114 comprises rows and columns, with one pixel defined at the intersection of each row and column. In one form of the invention, image data 114 includes a plurality of pixels, with each pixel being represented by a multi-bit value (i.e., each pixel is represented by an N-bit value, where N is greater than one). In one embodiment, each pixel in image data 114 is represented by a 2-bit value (e.g., black, white, and two gray levels). In another embodiment, each pixel in image data 114 is represented by a 4-bit value. In another embodiment, each pixel is represented by a 1-bit value (e.g., black and white).

Printer 120 includes processor 122, I/O interface 126, memory 128, and laser print engine 130, which are communicatively coupled together via bus 124. I/O interface 126 of printer 120 is electrically coupled to I/O interface 116 of computer 102 through communication link 118. In one embodiment, I/O interfaces 116 and 126 are serial interfaces, such as universal serial bus (USB) interfaces, and communication link 118 is a USB cable. In another embodiment, I/O interfaces 116 and 126 are network interfaces, and communication link 118 is a network, such as a local area network. In other embodiments, other types of interfaces and communication links may be used, including those for wireless communications.

After rendering data 112 into image data 114, computer 102 outputs the image data 114 to printer 120 via communication link 118. The received image data 114 is stored in memory 128 of printer 120, where it is retrieved and processed by laser print engine 130 and printed to a medium. In one embodiment, image data 114 is compressed by computer 102 for transmission to printer 120 through communication link 118. Image data 114 is then decompressed by printer 120 by firmware or dedicated hardware.

Figure 1B:
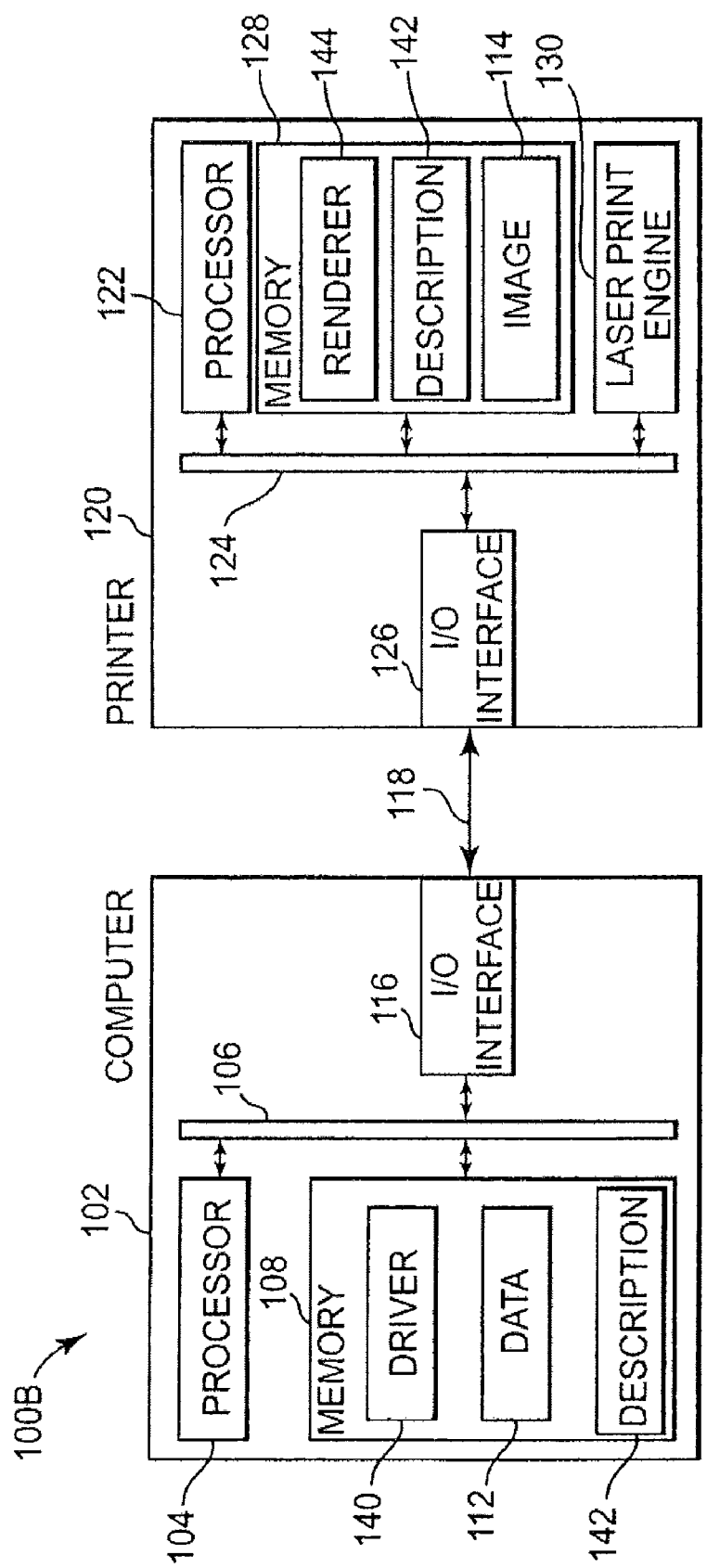
FIG. 1B is a block diagram illustrating another embodiment of major components of a printing system.

FIG. 1B is a block diagram illustrating another embodiment of major components of a printing system 100B. Printing system 100B includes similar hardware as printing system 100A. But in system 100B, image data 114 is rendered by printer 120, rather than by computer 102. In one embodiment, driver 140 converts data 112 to be printed into a description file 142. In one form of the invention, driver 140 is a printer command language (PCL) driver for converting data 112 into a description file 142 that includes data and high level commands (e.g., place a Helvetica 12 point letter "Q" at location x,y on the page). Computer 102 transfers description file 142 to printer 120 via communication link 118, and printer 120 stores file 142 in memory 128.

Processor 122 then renders description file 142 into image data 114, including performing a dual halftone process as described in further detail below with reference to FIGS. 2-5. In one embodiment, printer 120 includes PCL firmware for rendering the description file 142 into image data 114. Image data 114 is stored in memory 128 of printer 120, where it is retrieved and processed by laser print engine 130 and printed to a medium.

Figure 2:
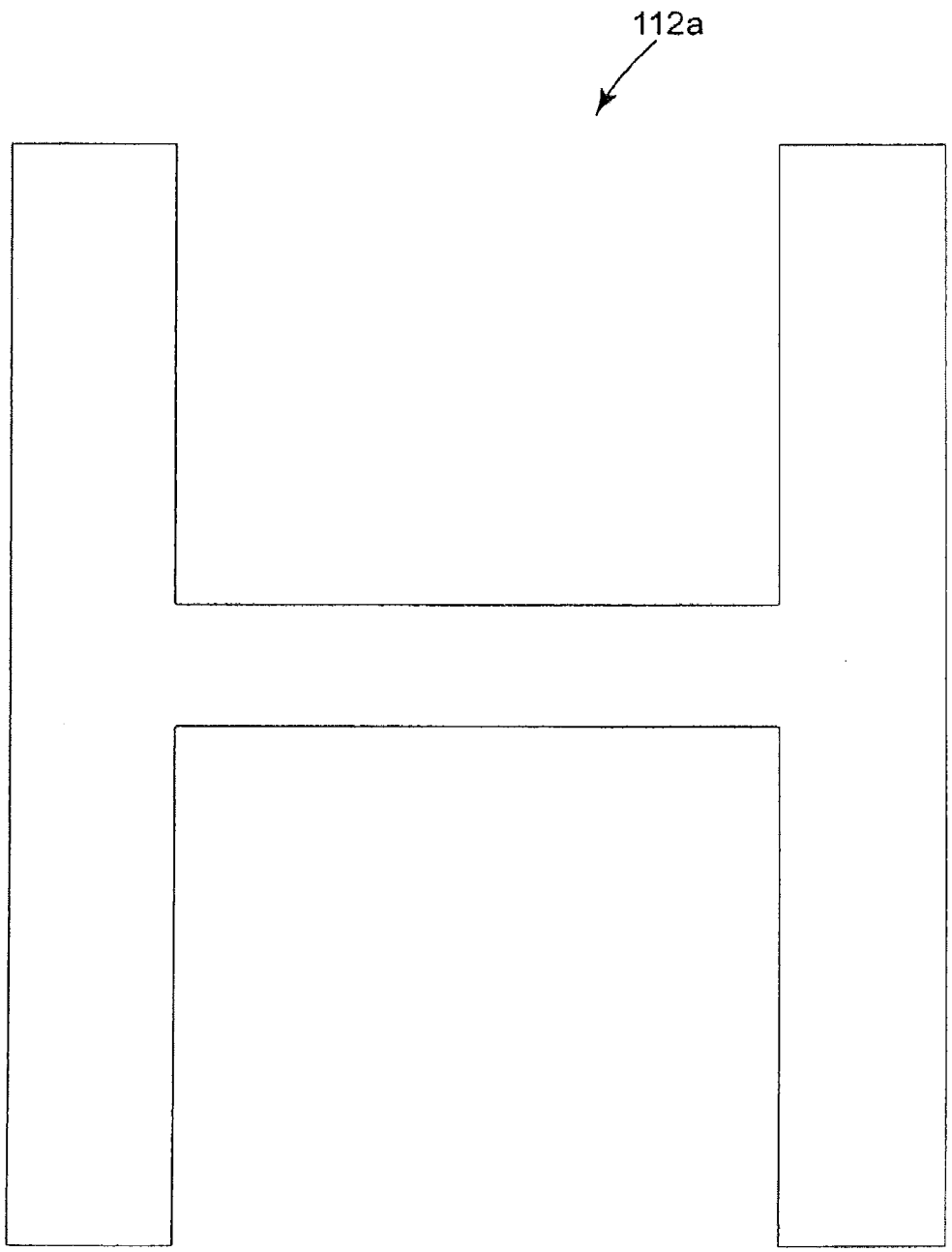
FIG. 2 is an image illustrating one embodiment of a 50% gray scale magnified letter "H."

FIG. 2 is an image illustrating one embodiment of a 50% gray scale magnified letter "H" 112a. Magnified letter "H" 112a is a portion of data 112 to be printed. Magnified letter "H" 112a is rendered by processor 104 or processor 122 into image data 114.

Figure 3:
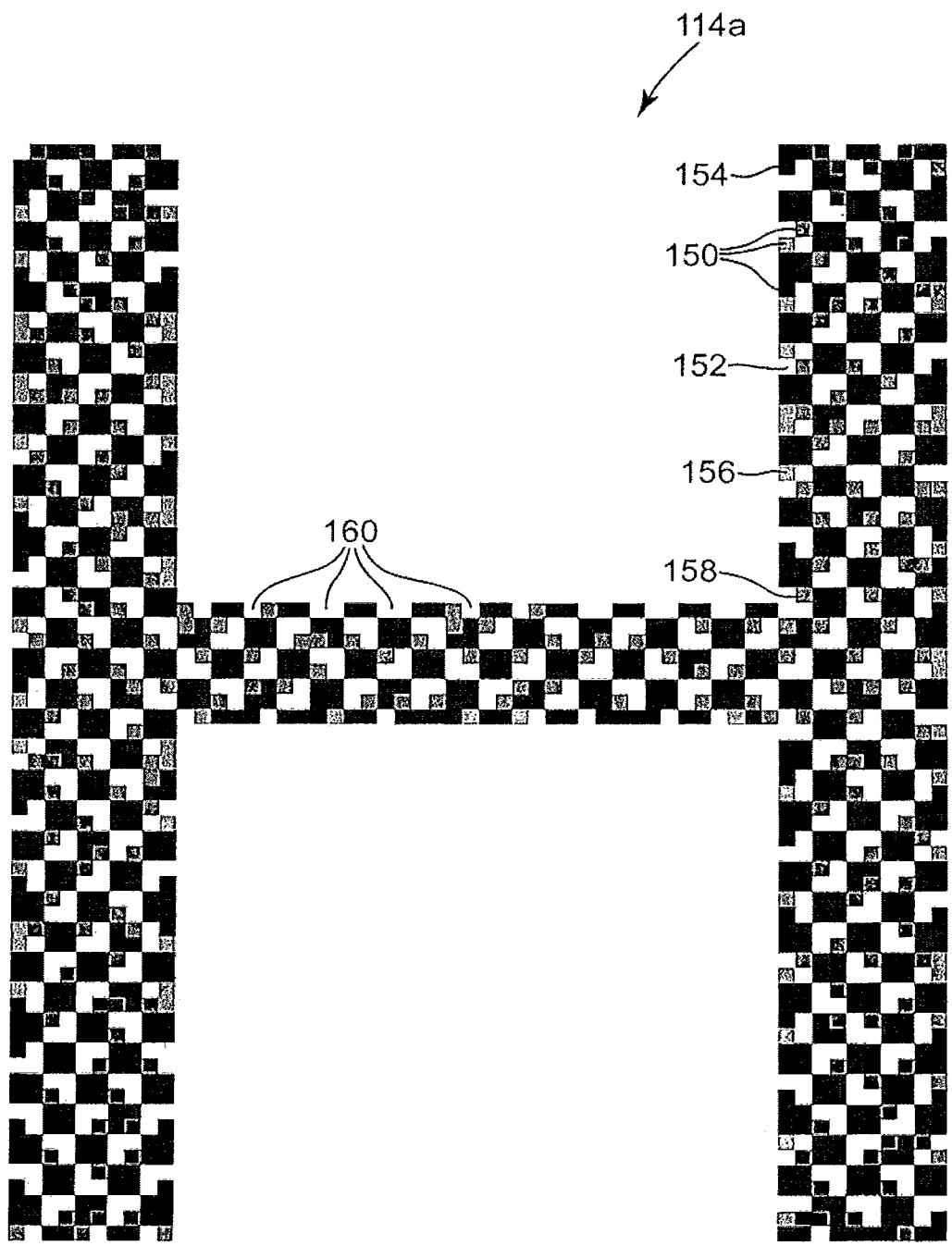
FIG. 3 is an image illustrating one embodiment of the magnified letter "H" after a digital halftone process has been applied to the image.

FIG. 3 is an image illustrating one embodiment of magnified letter "H" 112a after a digital halftone process has been applied to the image to generate a halftone image 114a. Each square in halftone image 114a represents a pixel, as indicated, for example, at 150. In this embodiment, halftone image 114a includes 2-bit per pixel data, which results in four possible pixel values. The four possible pixel values include 0 (white), as indicated for example at 152, 1 (light gray), as indicated for example at 156, 2 (dark gray), as indicated for example at 158, and 3 (black), as indicated for example at 154. The four pixel values indicate the amount of toner applied in each pixel, from white where no toner is applied to the pixel, to black where toner is applied to the entire pixel. The 2-bit per pixel halftone image 114a approximates the 50% gray scale letter "H" 112a when the letter "H" is printed at its true size.

The halftone process results in jagged edges, however, as indicated for example at 160. When halftone image 114a is printed, the jagged edges make the image look less sharp. The jagged edges are due to the pixel edges having both black and white values and the spacing between the white (or black) pixels. A lower lpi pattern has larger spacing resulting in larger runs of adjacent white pixels and black pixels. The lower lpi pattern also has lower frequency content that the human visual system picks up on more easily than higher frequency content, such as a higher lpi pattern.

Figure 4:
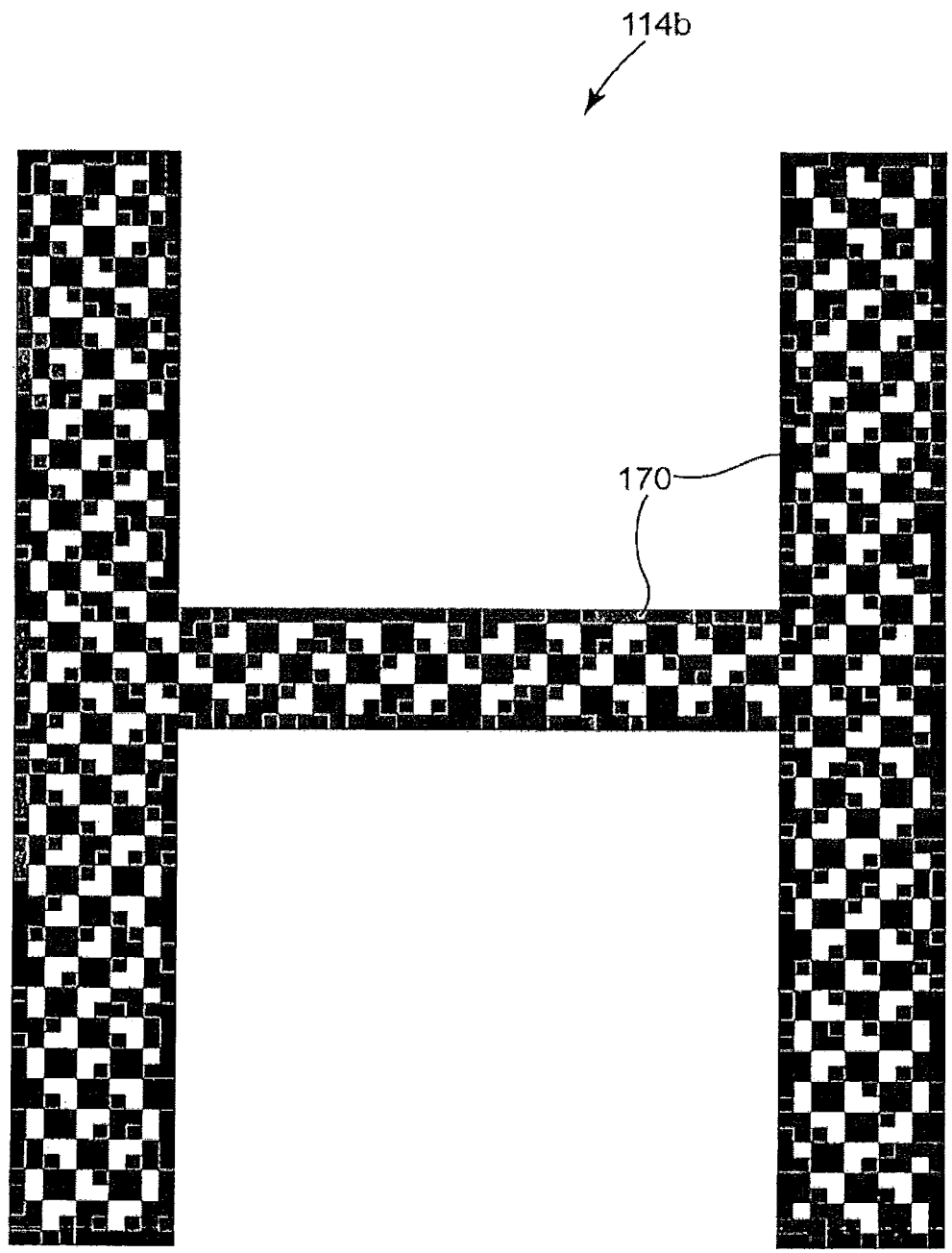
FIG. 4 is an image illustrating one embodiment of the magnified letter "H" after a dual digital halftone process has been applied to the image.

FIG. 4 is an image of one embodiment of the magnified letter "H" after a dual digital halftone process has been applied to the image to generate a dual halftone image 114b. In this embodiment, the edges, indicated for example at 170, of dual halftone image 114b do not have 0 (white) pixel values. The absence of 0 (white) pixel values on the edges of dual halftone image 114b results in sharp edges and prevents the jagged edges illustrated in halftone image 114a.

The jagged edges are corrected by applying a different halftone to the edges of dual halftone image 114b, as described in further detail below with reference to FIG. 5. The interior of dual halftone image 114b is similar to halftone image 114a where a single halftone is applied. In this embodiment, halftone image 114a and the interior of dual halftone image 114b are halftoned with a 120 lines per inch (lpi) 45° black screen. The edge of dual halftone image 114b is halftoned with two possible pixel values per edge portion to approximate the edge value of each edge portion.

In one embodiment, the halftone algorithm darkens the edge input slightly and then semi-randomly outputs the two output levels closest to the input percentage. For example, if for the 2-bit per pixel output: 0=0/3 pulse of the laser, 1=1/3 pulse of the laser, 2=2/3 pulse of the laser, and 3=3/3 pulse (or full pulse) of the laser, then for 8-bit per pixel input, an edge value of 128 may be biased to 153. This is approximately 60% of the full pulse value of 255. Therefore, the halftone algorithm attempts to cover on average approximately 60% of the edge. This coverage is obtained by semi-randomly varying the output levels between 1 and 2 (1/3 and 2/3), while biasing toward 2's to get closer to 60%, instead of the 50% that would result if the halftone algorithm evenly alternated between 1 and 2.

By using a gray scale to prevent varying between black and white, the amplitude of modulation is lowered. By semi-randomly varying the output levels, the pattern has significant high frequency content. The combination of the gray scale and the semi-random variation of the output levels results in sharp edges when viewed by the human visual system.

Figure 5:
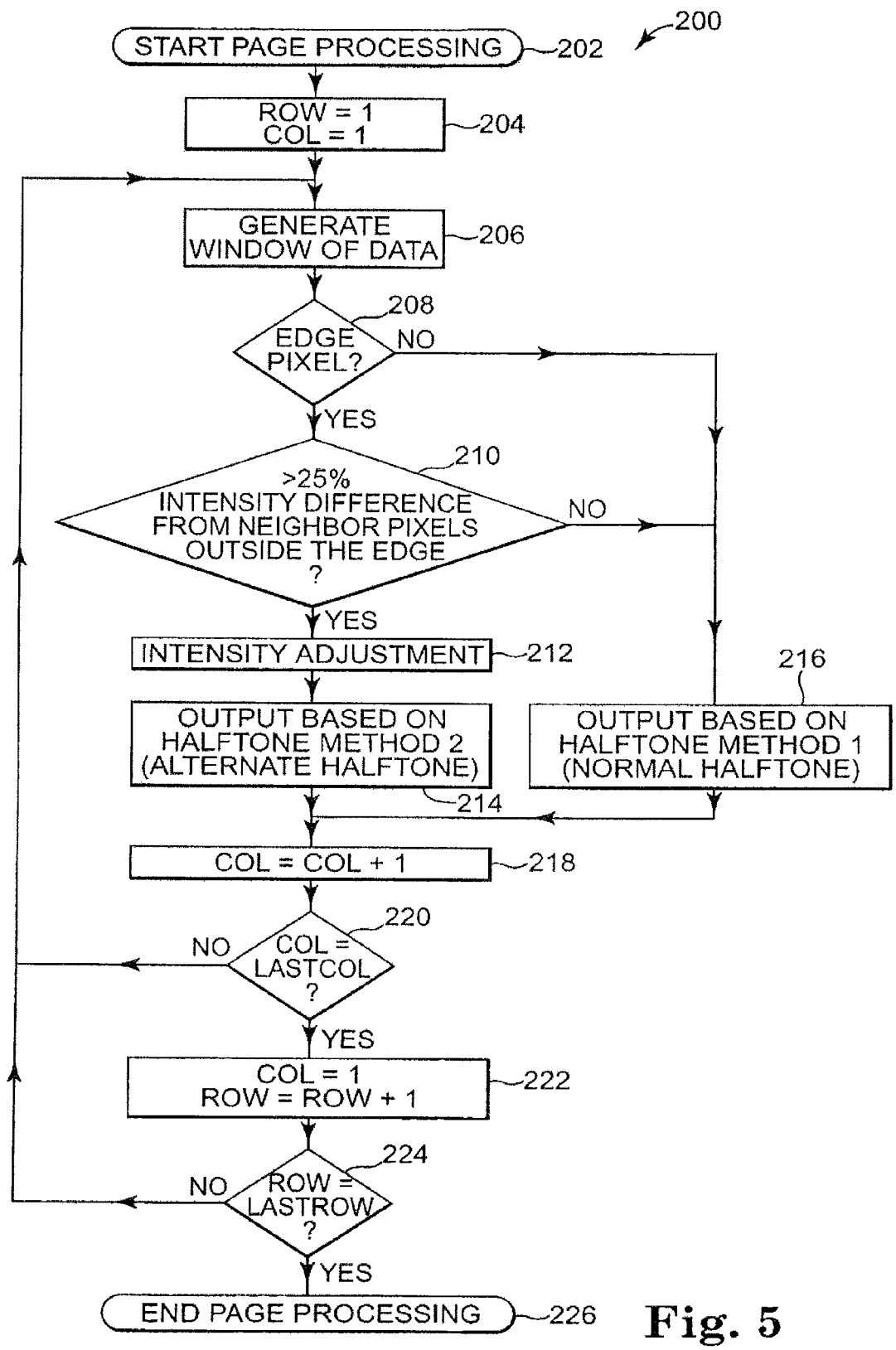
FIG. 5 is a flow diagram illustrating one embodiment of a method for applying a dual digital halftone process to an image.

FIG. 5 is a flow diagram illustrating one embodiment of a method 200 for rendering data 112 into image data 114 having dual halftones. Method 200 is performed by processor 104 or processor 122. At 202, image processing is started. At 204, the row (Row) of image data 114 is set equal to one and the column (Col) of image data 114 is set equal to one. At 206, a window of data is generated around the selected pixel. At 208, the processor determines whether the selected pixel is an edge pixel. If the selected pixel is not an edge pixel, then at 216, the output is based on halftone method one (normal halftone). If the selected pixel is an edge pixel, then at 210, the processor determines if the intensity difference from neighbor pixels outside the edge is greater than 25%, or other suitable value. If the intensity difference from neighbor pixels outside the edge is greater than 25%, or other suitable value, then at 212, the intensity of the edge pixel is adjusted. If the intensity difference from neighboring pixels from outside the edge is less than 25%, or other suitable value, then at 216, the output is based on halftone method one (normal halftone).

At 214, the output is based on halftone method two (alternate halftone) for the edge pixel. At 218, Col is incremented by one. At 220, the processor determines if the last column of image data 114 has been processed. If the last column of image data 114 has not been processed, then control returns to block 206 where the next column of image data 114 begins processing. If the last column of image data 114 has been processed, then at 222, Col is set equal to one and Row is incremented by one. At 224, the processor determines whether the last row of image data 114 has been processed. If the last row of image data 114 has been processed, then at 226, processing of image data 114 is completed. If the last row of image data 114 has not been processed, then control returns back to block 206 where the next row of image data 114 begins processing.

In one embodiment, halftone method two (alternate halftone) is any suitable halftone capable of recreating edges that look sharp rather than jagged when printed. Halftone method one (normal halftone), in one embodiment, is any suitable halftone capable of rendering smooth intensity ramps and substantially eliminating banding. In one embodiment, halftone method two (alternate halftone) uses a higher lpi than halftone method one (normal halftone) used for the portions of the image that are not edges. For example, in one embodiment, halftone method one (normal halftone) is a halftone in the 100-150 lpi range, and halftone method two (alternate halftone) is a halftone in the 200-300 lpi range, such as 212 lpi. In other embodiments, other halftones can be used for halftone method one (normal halftone) and halftone method two (alternate halftone).

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A printer controller for processing data representing an image, the printer controller comprising:
   a first module configured to perform a first halftone process on an edge portion of the image, wherein the edge portion is located by comparing an intensity value of a first pixel and an intensity value of a second pixel and wherein the first halftone process comprises accessing two or more nonzero values based on the intensity value of the first pixel and alternating between the two or more nonzero values when multiple pixels comprise a same intensity value as the intensity value of the first pixel; and
   a second module configured to perform a second halftone process on a non-edge portion of the image, wherein the first halftone process comprises a higher resolution than the second halftone process.

2. The printer controller of claim 1, wherein the first module adjusts the intensity value of the first pixel if a difference between the intensity value of the first pixel and the intensity value of the second pixel is greater than a programmable threshold.

3. The printer controller of claim 2, wherein the programmable threshold is 25% of the intensity value of the first pixel.

4. The printer controller of claim 1, wherein the first halftone process involves semi-randomly alternating between the two or more nonzero values.

5. The printer controller of claim 1, wherein the two or more nonzero values include three nonzero values representing three amounts of toner.

6. The printing system of claim 1, further comprising:
   a memory module operable to store the data representing the image.

7. The printing system of claim 1, wherein the first halftone process comprises a halftone within a range of approximately 200 lines per inch (lpi) to approximately 300 lpi and the second halftone process comprises a halftone within a range of approximately 100 lpi to approximately 150 lpi.

8. The printing system of claim 1, wherein the first module and the second module comprise hardware.

9. The printer controller of claim 1, wherein the first module and the second module comprise firmware.

10. A printer controller comprising:
    first circuitry for identifying edge pixels and center pixels; and
    second circuitry for applying a first halftone to at least some of the edge pixels of an image and a second halftone to at least some of the center pixels, wherein the first halftone comprises a higher resolution than the second halftone and the first halftone comprises accessing two or more nonzero values based on an intensity value of one of the edge pixels and alternating between the two or more nonzero values when additional edge pixels comprise the intensity value.

11. The printer controller of claim 10, wherein the first circuitry identifies the center pixels and the edge pixels by comparing intensity values of adjacent pixels.

12. The printer controller of claim 10, further comprising:
    third circuitry for adjusting intensity values of the at least some of the edge pixels when a difference in values of adjacent pixels is above a programmable threshold.

13. The printer controller of claim 10, wherein the first halftone alternates between the two or more nonzero pixel values such that one of the two or more nonzero pixel values is selected more often than another of the two or more nonzero pixel values.

14. The printer controller of claim 10, wherein the first circuitry and the second circuitry comprise hardware.

15. The printer controller of claim 10, wherein the first circuitry and the second circuitry comprise firmware.

16. A method for halftoning an image, the method comprising:
    receiving image data;
    locating, in the image data, a first image portion including an edge and a second image portion lacking an edge by comparing an intensity value of a first pixel and an intensity value of a second pixel;
    applying a first halftone to the first image portion by accessing two or more nonzero values based on the intensity value of the first pixel and alternating between two or more nonzero values corresponding as one or more subsequent pixels have the intensity value of the first pixel; and
    applying a second halftone to the second image portion, wherein the second halftone has a lower resolution that the first halftone.

17. The method of claim 16, further comprising:
    adjusting the intensity value of the first pixel if a difference between the intensity value of the first pixel and the intensity value of the second pixel is greater than a programmable proportion of the intensity value of the first pixel.

18. The method of claim 16, wherein the alternating between the two or more nonzero pixel values occurs semi-randomly.

19. The method of claim 16, wherein the second halftone results in a resolution in a range of approximately 100 lines per inch (lpi) to approximately 150 lpi and the first halftone results in a resolution in the range of approximately 200 lpi to approximately 300 lpi.

20. The method of claim 16, further comprising:
    storing the image data in a memory.

* * * * *